(12) United States Patent
Gilliam et al.

(10) Patent No.: US 9,994,683 B2
(45) Date of Patent: Jun. 12, 2018

(54) METHOD AND APPARATUS FOR SURFACE CHEMICAL FUNCTIONALIZATION OF POWDERS AND NANOPARTICLES

(71) Applicant: Kettering University, Flint, MI (US)

(72) Inventors: Mary Gilliam, Brighton, MI (US); Susan Farhat, Holt, MI (US); Graham Garner, Grand Blanc, MI (US); Michael Magyar, St.Clair Shores, MI (US)

(73) Assignee: Kettering University, Flint, MI (US)

( * ) Notice: Subject to any disclaimer, the term of this patent is extended or adjusted under 35 U.S.C. 154(b) by 233 days.

(21) Appl. No.: 14/776,078

(22) PCT Filed: Mar. 14, 2014

(86) PCT No.: PCT/US2014/027814
§ 371 (c)(1),
(2) Date: Sep. 14, 2015

(87) PCT Pub. No.: WO2014/143731
PCT Pub. Date: Sep. 18, 2014

(65) Prior Publication Data
US 2016/0039979 A1    Feb. 11, 2016

Related U.S. Application Data

(60) Provisional application No. 61/788,120, filed on Mar. 15, 2013.

(51) Int. Cl.
*C08J 3/24* (2006.01)
*C08J 3/12* (2006.01)

(52) U.S. Cl.
CPC ........... *C08J 3/24* (2013.01); *C08J 3/124* (2013.01); *C08J 2323/12* (2013.01); *C08J 2327/18* (2013.01); *C08J 2333/12* (2013.01)

(58) Field of Classification Search
None
See application file for complete search history.

(56) References Cited

U.S. PATENT DOCUMENTS

| 6,156,114 A | 12/2000 | Bell et al. |
| 2003/0116228 A1* | 6/2003 | Pozarnsky ............ B22F 1/0018 148/251 |
| 2008/0145553 A1* | 6/2008 | Boulos ................. B01J 19/088 427/447 |

FOREIGN PATENT DOCUMENTS

WO    2009/033476 A2    3/2009

\* cited by examiner

*Primary Examiner* — Kishor Mayekar
(74) *Attorney, Agent, or Firm* — Brinks Gilson & Lione (57) ABSTRACT

A method and apparatus is provided for the modification of the surface chemistry of solid nano- and micro-particles in order to tailor the properties and functions of these particles. The method generally involves the generation of an atmospheric plasma glow discharge and energetic species that undergo chemical reaction with the surface of the primary particles. The process includes the generation of energetic species to initiate reaction, optional delivery of a precursor fluid, optional delivery of chemical species for grafting, and delivery of separated and de-agglomerated particles into the plasma discharge exiting the plasma generation chamber.

16 Claims, 11 Drawing Sheets

METHOD AND APPARATUS FOR SURFACE CHEMICAL FUNCTIONALIZATION OF POWDERS AND NANOPARTICLES

CROSS REFERENCE TO RELATED APPLICATIONS

This application is the National Stage of International Application Serial No. PCT/US2014/027814 filed on Mar. 14, 2014, designating the United States and published in English, which claims the benefit of the filing date under 35 U.S.C. § 119(e) of U.S. Provisional Application No. 61/788,120 filed Mar. 15, 2013, the entire contents of each of which are hereby incorporated herein by reference.

This disclosure relates generally to a method and apparatus for modification of the surface chemistry of solid nanoparticles and microparticles to tailor the properties and functions of these particles. More specifically, the invention describes a method involving the generation of an atmospheric plasma glow discharge and energetic species that undergo chemical reaction with the surface of the primary particles. The invention also describes a method to graft chemical species onto the surface of the particles through creation of reactive sites on the surfaces that react with added chemical species. The invention also describes an apparatus comprising an atmospheric pressure plasma process with said process including the generation of energetic species to initiate reaction, optional delivery of a precursor fluid, optional delivery of chemical species for grafting, and delivery of separated and de-agglomerated particles into the plasma discharge exiting the plasma generation chamber.

The statements in this section merely provide background information related to the present disclosure and may not constitute prior art.

Surface treatments and coatings can improve the performance of materials in existing applications, as well as enable the further expansion into new applications. Surface modification and coating is often performed to improve adhesion to another material or component, tailor hydrophobic or hydrophilic properties, improve biocompatibility, immobilize certain molecules or biomolecules, increase barrier properties, reduce friction, and enhance resistance to chemicals, as well as meet other goals that target specific applications. Surface modification technologies include physical treatments, wet chemical treatments, and dry process treatments and coatings, such as plasma, corona, and flame. Plasma processes have been widely used to chemically modify the surface of various materials by altering surface properties and functions, while maintaining the bulk properties of the material. Plasma surface treatment has primarily been applied to flat sheets, films, or formed parts, rather than small particles and powders.

Plasma treatment of powders and particles inherently presents challenge for uniformly treating all exposed surfaces of the particles given the high surface area compared to larger sheets and parts. Additionally, the particles can agglomerate into larger clusters of particles in a more thermodynamically stable state. If the clusters are not de-agglomerated, then only a fraction of the surfaces of the primary particles will be treated in the process. Breaking apart the particle agglomerates and exposing all surfaces during treatment is necessary for uniform treatment of the particles. Some materials, especially organic and polymeric materials, are more susceptible to degradation in a plasma environment and can degrade upon exposure or after prolonged exposure to high energy ions and other species in a plasma environment. When the particles are located in the plasma generation area within an electric field, detrimental damage can occur from high temperatures, ion bombardment, filamentary discharges, and generally excessive treatment. Furthermore, the particles can coat the surfaces of the electrodes used to generate the plasma over time, negatively impacting the processing.

Some plasma treatment techniques for particles have been reported, including vacuum and atmospheric pressure processes. The current technologies include those in which the particles are placed in an electric field where surface charging, high temperatures, and ion bombardment that can bring about undesirable degradation. Furthermore, many of the treatments are not adequate to separate particles before and during treatment with high propensity to agglomerate. Other reported technologies can bring about inhomogeneous treatments due to filamentary discharges, in-adequate de-agglomeration, long treatment times, non-uniform surface exposure, or multiple treatments. Even others employ complicated and costly methods, such as low pressure processing, multiple steps, long treatment times, or fluidized beds, which generally employ batch processing and are not feasible for de-agglomeration of very small particles.

The method in U.S. Pat. No. 4,685,419 requires low pressure and a fluidized bed, which is not effective for de-agglomerating particles in the low micron and sub-micron sizes. U.S. Pat. No. 5,620,743 also describes a solid particle treatment process using a low pressure fluidized bed. The method described in U.S. Pat. No. 5,283,086, uses low pressure operation and a stir mechanism which brings about non-uniform exposure and involves long treatment times.

A method to functionalize particles under atmospheric pressure is described in U.S. Pat. No. 7,758,928 B2, which involves the creation of a fluidized bed of the particles while the downstream discharge of plasma is injected into the sides of the bed. The technique is not sufficient for de-agglomeration and uniform treatment. Long treatment times are reported.

In U.S. Pat. No. 6,156,114 a process is disclosed that involves a plasma treatment of pigment particles. The particles are limited to those with agglomerated particles no larger than 10-30 times the primary particle size. Multiple steps are employed to further de-agglomerate the particles into fractions of de-agglomerated particles. This process seems to be more suitably operated under vacuum.

In U.S. Publication No. 2008/0145553A1 a dielectric barrier discharge (DBD) torch is disclosed in which a monomer and the particles are fed directly into the torch to form a coating on the surface of the particles.

The method described in U.S. Pat. No. 6,824,872 B2 requires a chemical pre-treatment step before plasma treatment; the surfaces of all particles are not uniformly exposed and treated by the plasma.

U.S. Publication No. 2011/0039036 discloses an atmospheric plasma method with alternating array of electrodes closely spaced that create a dielectric barrier discharge (DBD). The technique is ineffective at de-agglomerating low micron and sub-micron size particles for treatment and long residence times and multiple treatments were reported.

BRIEF SUMMARY OF THE INVENTION

In overcoming the enumerated drawbacks and other limitations of the related art, the present invention provides an atmospheric plasma chemical surface modification process for solid low micron and sub-micron particles that imparts new chemical functional groups or grafted molecules onto the surface of the particles. The process is fast, continuous, low temperature, and brings about uniform surface modification. The method generally comprises providing a low temperature atmospheric plasma jet, transport of separated and de-agglomerated particles for modification, an optional injection of precursor chemical or chemical species for grafting, and collection of the treated particles. The method can be used to impart new surface chemistries and functionality. The type of surface functional groups that can be formed using this method are numerous and the resulting surface properties and functionalities can include, but are not limited to, wettability, compatibility with other substances, dispersion in liquids or solvents, biocompatibility, targeted bioactivity. Another aspect of the invention involves grafting or immobilization of specific molecules, biomolecules, organic materials, or other chemical or biological component to the surfaces of the particles.

According to one aspect of the present disclosure, the method involves a non-thermal atmospheric pressure plasma jet that can produce a homogeneous glow discharge exiting a plasma generation chamber at zero potential. The spatial de-coupling of plasma generation and particle treatment enables treatment of temperature sensitive particles, such as many organic materials, and avoids bombardment by high energy species, filamentary surface discharges, charging of the particles, and high temperatures. Furthermore, to enable low treatment times, the source is one of any of a number of sources that produces a high plasma density in atmospheric plasma. Such types of plasma sources include those with an internal cathode separated by the anode as the plasma nozzle or housing with insulation, and high flow rate of ionization gas (1,000-2,500 L/hr). The high flow rate of the ionization gas also provides an advantage in maintaining separation of the particles during treatment. The energy supplied to the gas can be powered using Direct Current (DC), pulsed-DC, and alternating current in any suitable frequency, including low frequencies, as well as Radio Frequency (RF) and Microwave (MW). The gas used for the plasma can be any gases that can be used to generate a plasma discharge, including, but not limited to, any of the following used alone or in combination thereof: oxygen, nitrogen, argon, helium, carbon dioxide, neon, krypton, xenon, or other.

According to another aspect of the present disclosure, particles are transported to the system in such a way that all surfaces are exposed to the plasma. For larger, free-flowing particles that do not agglomerate, such as some polymer particles >250 microns, the preferred method of transport of the particles to the plasma treatment zone includes those driven by gravity. Furthermore, the flow of particles is metered or restricted to deliver single particles separated by a distance from the others of a distance that is equal or greater than the particle size to enable treatment of all sides. For smaller particles that agglomerate readily, de-agglomeration techniques are needed to separate the particles before treatment. De-agglomeration techniques can include any techniques that effectively disperse the agglomerates into the individual primary particles and maintain separation of the particles in a gas or as an aerosol. The de-agglomeration techniques can be any that are known to one skilled in the art, including those involving high velocity gas streams, such as jet mills, dust-feed dispersers, and venturi tubes, which create shear forces to break apart the particles due to turbulence or centrifugal forces.

According to yet another aspect of the present disclosure, the separated particles in the gas are directed to the treatment zone and encounter the plasma glow discharge at the exit of the plasma generator. In the treatment zone, the separated particle surfaces encounter the high energy species in the plasma glow discharge and undergo chemical reaction. These reactions can involve ablation of surface elements or molecule side groups, bond cleavage, etching, surface crosslinking, and the creation of reactive functional groups. The type of reactions and reactivity of the particle surfaces depend on the particle material, the plasma process gas or mixture, and the plasma process conditions. The process can be operated with addition of a chemical precursor, which reacts with the plasma species to form derivatives that react with the particle surfaces, resulting in the formation of new chemical functional groups. The chemical precursor can be chosen based on the desired functionality of the surface of the treated particles from a wide variety of chemicals that can be delivered in gas, vapor, or liquid form.

According to another aspect, a chemical or biological component is added to the process downstream from the plasma glow discharge for grafting or immobilization onto the particle surfaces. In this case, an active site created on the particle from plasma treatment reacts with the added component or mixture to bind to the surface. The type of component can be chosen from a wide variety of chemical and biological compounds based on the final application of the particles.

Finally, another aspect of the present disclosure involves particle collection that occurs downstream of the treatment zone and can include any method for collection of particles from a gas stream. The techniques can include any known to those skilled in the art, including dry and wet methods.

It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the description, corresponding reference numerals indicate like or corresponding parts and features.

The present disclosure generally provides a process or method of surface treating particles that involves the generation of an atmospheric pressure plasma discharge jet for use in the surface modification of particles. The method for the surface chemical functionalization of nano- and micro-sized solid particles generally comprises the steps of: (i) producing an atmospheric plasma discharge comprising energetic plasma species; (ii) delivering a chemical precursor fluid to the plasma discharge; (iii) delivering a stream of nano- or micro-sized particles, such that the particles contact the plasma discharge and precursor fluid; (iv) allowing the precursor fluid to be chemically activated and reactive sites on the particles' surface to form by interaction with the energetic plasma species in the plasma discharge; (v) modifying the surface of the particles by grafting the activated precursor fluid to the reactive sites on the particles' surface; and (vi) collecting the surface modified particles in a fluid stream or a vessel.

Alternatively, the method for the surface chemical functionalization of nano- and micro-sized solid particles comprises the steps of: (a) producing an atmospheric plasma discharge comprising energetic plasma species; (b) delivering an optional chemical precursor fluid to the plasma discharge; c) separating the solids into primary particles in a gas and transporting them in a separated state to contact the plasma discharge and optional precursor; (d) modifying the surface of the particles by reaction with the high energy species or activated precursor derivatives; (e) delivering an optional chemical or biological component downstream of the plasma glow discharge for grafting or immobilization on the treated particle surfaces; and (f) collecting the treated particles in a dry state or in a liquid dispersion. The method generally incorporates either (b) delivering a chemical precursor fluid or (e) delivering a chemical or biological component. Alternatively, the method incorporates the delivery of both the (b) chemical precursor and (e) chemical or biological component.

The method and apparatus described in this disclosure bring about fast, uniform surface treatment in a configuration conducive for scale-up. The low temperature treatment zone is spatially separated from the plasma source electric field and absent of filaments, which inhibits surface damage and makes it suitable for most materials, including organic and biological materials. Furthermore, the method enables tailoring the surfaces of particles with a wide variety of surface functional groups or grafted molecules or biomolecules. The products of the invention include surface functionalized particles that can be used in any number of applications where particles are used or could be used, including, but not limited to, those in composites, pigments, coatings, medical diagnostics, biological separations, cosmetics and personal care, reconstructive surgery, emobilization, drug delivery, bone tissue engineering, lab-on-a-chip, seed treatments and coatings, and more.

Figure 1:
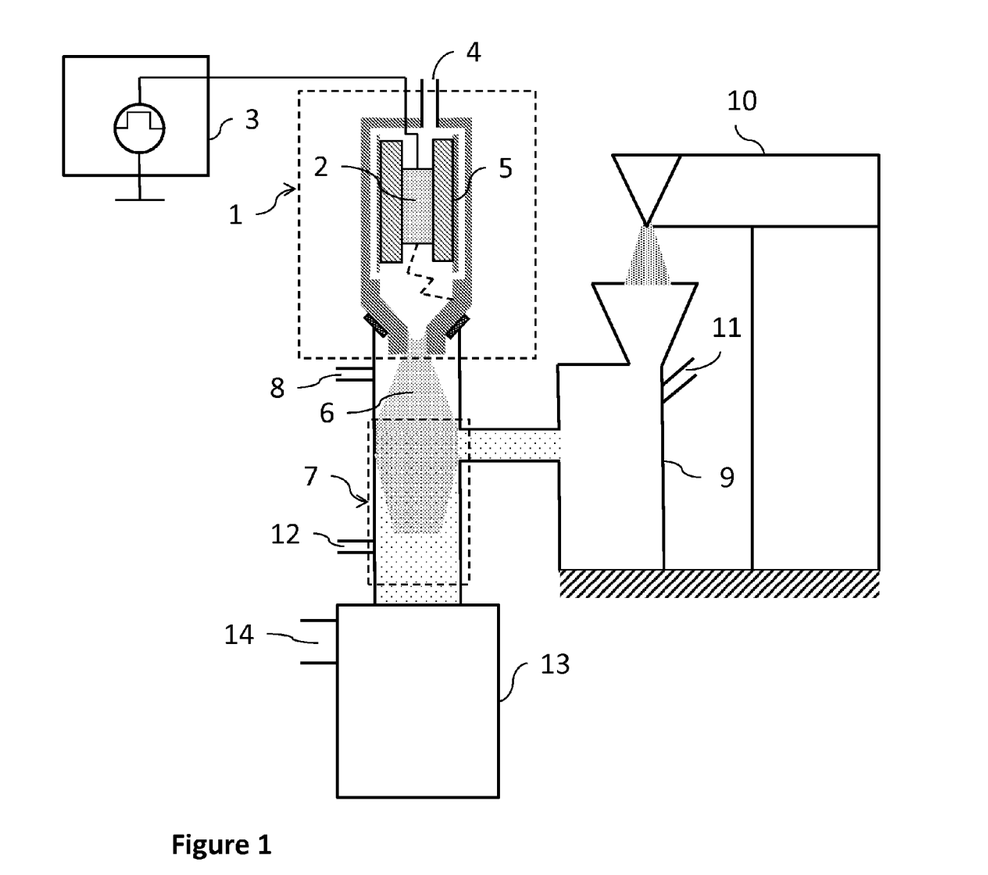
FIG. 1 is a schematic representation of an apparatus configuration for treating the surface of particles according to an aspect of the present disclosure.

The present invention generally provides a process or method of surface treating particles that involves the generation of an atmospheric pressure glow plasma discharge for surface modification of the particles. An example of a favorable embodiment of the invention is shown in FIG. 1. This method involves a non-thermal atmospheric plasma source 1 generated using any known source that creates a homogeneous, current-carrying arc in which the nozzle is the anode and the plasma exits the source at zero potential and high density of plasma species. Alternatively, the plasma source power consists of DC, pulsed-DC, RF, MW, or a hybrid of these, such as a Hybrid Hollow Electrode Activated Discharge (H-HEAD). An electrode 2 housed in the source is powered by a power supply 3. Ionizing gas enters the source through a port 4 where it is ionized by the electrode and insulating material 5 is located against a portion of the inside of the metal housing. Near the nozzle exit where no insulation exits, the metal housing acts as an anode, in which the discharge exits at zero potential. Stainless steel is an example of a material that may be used to form the plasma source housing. The flow rate of the gas stream is sufficiently high to enable the creation of a stable glow discharge outside of the source with high velocity. An ideal operating range for the flow rate of the ionizing gas is 1000-2500 L/hr under standard temperature and pressure. The plasma discharge exits the source at zero potential 6 and expands into the particle treatment zone 7.

The treatment chamber, as well as the entire process chamber, may be comprised of metal, glass, ceramic, plastic, or composite. Alternatively, the materials for use in forming the treatment chamber may include steel and glass. The inner diameter of the treatment chamber ideally is a size that enables the plasma discharge to expand to reach the inner walls of the chamber. In one embodiment of the present disclosure, the treatment chamber consists of a diameter of 10-25 mm. A port 8 is available for a chemical precursor. According to one aspect of the invention, the reactive precursor consists of the medium, a component of the medium, or a compatible chemical in which the treated particles will be placed in the intended final use or application.

A particle disperser 9 is placed upstream from the particle treatment chamber in which the particles are de-agglomerated and dispersed in a gas carrier that transports the particles to the treatment chamber. Depicted in FIG. 1 is a jet mill (Jet-O-Mizer™ from Fluid Energy) that generates high velocity streams that grind and de-agglomerate the particles using turbulence and centrifugal forces. A trough for the particles 10 with vibration assistance is used to deliver the particles into the particle disperser. Alternatively, the particles can be transported using any device, such as a metering screw. The carrier gas for the particles enters a port 11 into the particle disperser. A port 12 is available downstream of the treatment zone for adding chemical or biological components for grafting to the plasma-treated particle surfaces or for adding a liquid medium to collect the treated particles into a fluid. The treated particles enter a collection chamber 13 using dry or wet separation and techniques and the gases exit the system 14.

The direction of the particle delivery can be positioned at any angle to the direction of the plasma discharge flow. According to one aspect of the present disclosure, the particle delivery is positioned at an angle of 90 degrees or less to the direction of the plasma discharge. The exit flow of treated particles downstream of the treatment zone can be positioned at any angle to the particle delivery and plasma discharge flow. In one aspect, the plasma discharge flow and the exit flow are positioned on the same axis, while the particle inlet is positioned at an angle of 90 degrees or less at the treatment zone, as shown in FIG. 1. In another aspect, the direction of particle transport and the exit flow are positioned on the same axis, while the plasma discharge inlet is positioned at an angle of 90 degrees or less to the particle stream. Any number of plasma discharges and particle inlet streams can be placed in the process.

Figure 2:
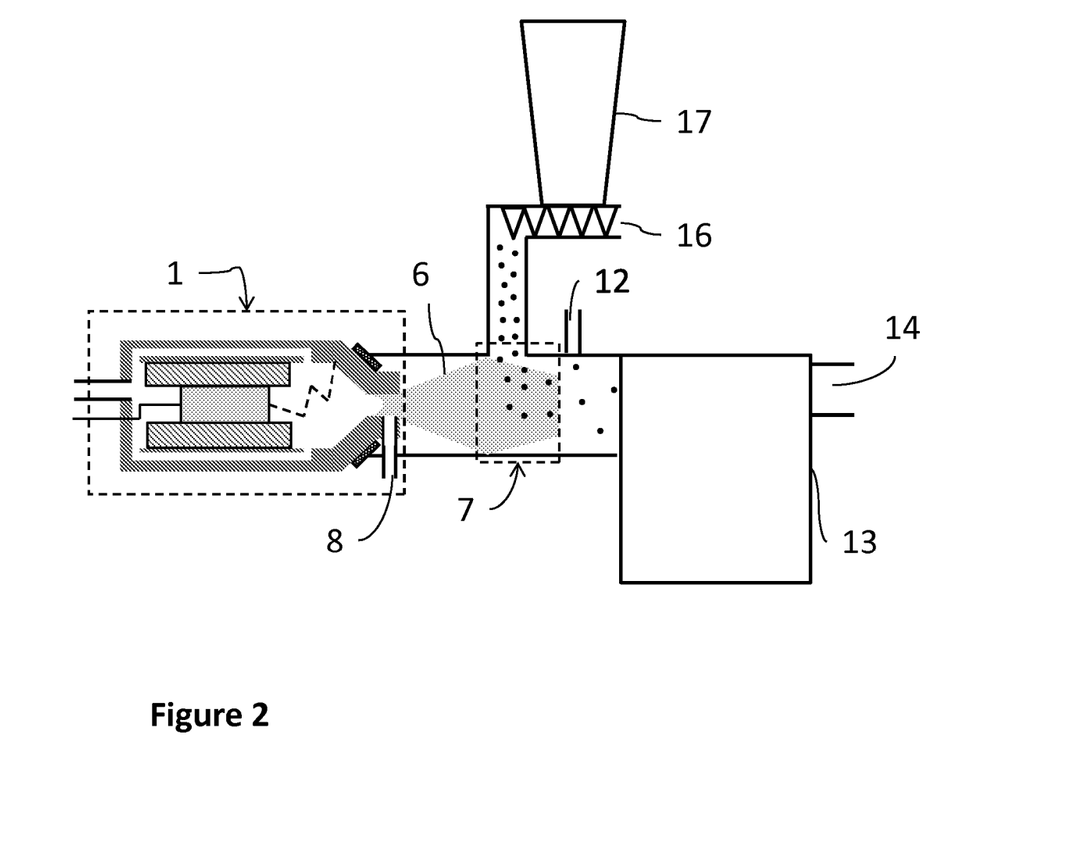
FIG. 2 is a schematic representation of another apparatus configuration for treating the surface of particles according to an aspect of the present disclosure

For some particle types, the primary particles are large enough in the micron range to exhibit free-flowing behavior and do not require de-agglomeration mechanism. In another embodiment of the invention, the particles are transported by gravitational force into the plasma delivered as individual, separated particles, as depicted in FIG. 2. The plasma source and components 1 consist of those described in FIG. 1, in which a homogeneous plasma discharge exits the plasma source 6 with an optional chemical precursor port 8 injected downstream of the plasma generation and electric field and upstream of the discharge exit. The particles are transported directly into the plasma treatment zone using gravitational force 7. The particles are transported using a metering screw 16 or any other mechanism that can deliver solid particles at a controlled rate. The particles are contained in a hopper 17 before transport to the plasma. A port 12 is placed downstream from the treatment zone to add chemicals for grafting to the plasma-treated particle surfaces or a liquid medium to collect the treated particles into a fluid. The treated particles are transported into a collection container 13 and the gas exits at 14.

Referring to FIGS. 3-18, various apparatus configurations for treating the surface of the particles according to the teachings of the present disclosure are provided. In these drawings, the symbol "A" represents the atmospheric plasma generator which produces a plasma discharge at the exit of the generator. The atmospheric plasma generator can be placed horizontally, vertically, or at some other angle. The symbol, "B" represents the chemical precursor, which is shown as entering a compartment at the exit of the plasma generator, sprayed externally into the plasma discharge, or both. The symbol "C" represents the particles, which are shown as sprayed externally into the plasma discharge, gravity fed into the plasma discharge, fed by ejection from a fluidized bed, or added to the chemical precursor and fed into a compartment at the exit of the plasma generator.

The nano- or micro-sized particles that undergo surface chemical modification in the process of the present invention may include any type or hybrid thereof, including organic, metal, ceramic, composite, biological, pharmaceutical, or other. When desirable the particles may be hollow or also comprise a surface coating. Small particles of the micron and sub-micron size have a tendency to agglomerate into larger clusters of particles and require techniques to break apart the aggregates to treat the surfaces of the primary particles. Depicted in FIG. 1 is a jet mill particle disperser that used high velocities to create turbulence and centrifugal forces. Dispersion of the particles into a gas stream can be achieved by any suitable means based on the particle type and size, including, but not limited to, an aerosol generator, dust disperser, and venturi tubes. A dispersion of primary particles is transported by a carrier gas to the treatment chamber. Carrier gases can include those that are inert, as well as gases and mixtures of gases that can undergo reaction with the plasma species, the activated chemical precursor, or the particles. Examples of suitable carrier gases used alone or as mixtures include air, nitrogen, oxygen, argon, helium, carbon dioxide, ammonia, and sulfur-containing gases. According to another aspect, vaporized chemical precursor can be added into the carrier gas or particle stream upstream of the treatment zone.

Once the particles enter the treatment chamber, they encounter the plasma discharge that contains high energy plasma species, including ions, electrons, excited neutrals, and radicals. The gas used for the process may include any monatomic gas, diatomic gas, molecular gas, or mixture thereof that could produce the plasma and sustain a discharge. Based on the gas or gas mixture used, elements contained in the process gas molecules can be incorporated into the new surface functional groups. Examples of suitable process gases that can be used alone or as mixtures include air, nitrogen, oxygen, argon, helium, krypton, neon, water vapor, hydrogen peroxide, carbon dioxide, ammonia, ozone, sulfur-containing gases, hydrocarbons, fluorocarbons, and organosilicon vapors. The atmospheric pressure plasma discharge can be generated from a single source, multiple sources, or arranged as an array of sources.

A precursor chemical can be added as a liquid or vapor at any point upstream or directly into the treatment zone to react with the plasma and form radicals or other reactive species in the discharge or to react with plasma-activated sites on the surface of the particles. The precursor chemical, when added, plays a key role in the chemical reaction mechanisms that determine the outcome of the treatment. The types of functional groups and surface properties can be tailored by changing the chemical precursor or mixture of precursors. In other words, the chemical precursor can be chosen based on the desired surface properties, the fluid or medium in which the particles will be used, and the final application of the treated particles. In addition, the location of the delivery of the chemical precursor and the addition of the chemical precursor to the particle stream can be adjusted to further affect the surface properties. According to one aspect of the invention, the chemical precursor is injected into a chamber containing the exiting plasma discharge. In this case, an additional compartment can be attached to the plasma generator, surrounding the plasma discharge and housing the precursor chemical. The compartment is open where it connects to the plasma generator, surrounds the plasma discharge, and contains an opening at the bottom to allow the mixture of the plasma discharge and the precursor chemical to exit.

The list of suitable chemical precursors is numerous and includes, but is not limited to, water, alcohols, acids, amines, ketones, aldehydes, fluorocarbons, or any organic chemical, phosphorous or sulfur containing chemicals, any organosilicon material, biological extract, biomolecules, and bioactive molecules. The chemical precursor may be the medium, a component of the medium, or a compatible chemical in which the treated particles will be used for applications of particle dispersions in liquid, in order to create compatible functional groups to the medium onto the surface of the particles. The types of new functional groups created on the surface depend on the type or mixture of precursor chemicals, the transport location of the precursor chemical, the particle material, the type of process gas, the species and energy levels in the plasma discharge, and the process conditions.

In another aspect, a chemical or biological component is injected into the stream of treated particles downstream of the treatment zone to react with the new reactive sites or radicals on the surface of the particles for grafting or immobilization. The chemical can be added as a gas, vapor, liquid, mist, spray, or any similar method. The list of chemicals for grafting is numerous and can be any from those that are organic molecules, hybrid molecules, biological extracts or materials, biomolecules, and bioactive molecules. Suitable chemicals for grafting can include monomers, polymers, organosilicon compounds, biomolecules, pharmaceuticals, enzymes, vitamins, antibodies, proteins, or others.

The treated particles are collected using any known means by one skilled in the art for separating and collecting particles from a gas stream. The end product can include the dry treated particles or the particles in a liquid dispersion. Some examples of dry collection methods include those that utilize centrifugal, gravitational, or inertial forces, while others include filters, such as a fabric filter, to collect the particles. For applications in which the final particles will be placed in a liquid dispersion, the medium in which the particles will be dispersed can be used to collect the treated particles from the gas stream, as in a wet scrubber.

According to one embodiment, the process is operated around atmospheric pressure without the use of pumps. The process can also be operated by addition of a vacuum pump, such as a coarse vacuum pump, downstream from the apparatus to increase the volume of the treatment zone.

The following specific embodiments are given to illustrate the design of the apparatus and the method used to modify the surface chemistry of solid nanoparticles and microparticles in order to tailor the properties and functions of these particles according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1

In this example, polytetrafluoroethylene (PTFE) particles from I. E. du Pont de Nemours and Company, 25 micron, are treated according to one aspect of the present disclosure using an apparatus similar to that shown in FIG. 1. The atmospheric pressure plasma device (Diener electronic GmbH+Co. KG, Germany) is comprised of a radio frequency RF power source operating at 20 kHz, 230 V, and 300 W. Air and nitrogen are used as the ionization gas and have a flow rate approximately 1,500 L/hr (standard temperature and pressure). Chemical precursors are added upstream from the treatment zone and consist of steam and a vaporized solution of 10% (hydroxyethyl)methacrylate (HEMA) in deionized (DI) water with flow rates ranging from 0-2 g/min. A jet mill disperser (Fluid Energy Processing & Equipment Co., Telford, Pa.) is used to disperse the particles into a carrier gas of nitrogen at 85 psig and the particles are transported through the system at a rate of approximately 2 g/min. Collection of the treated PTFE particles is achieved by injecting steam into a port downstream from the treatment zone at a rate of 10-15 g/min to separate the powder from the gas as it exits the system. The gas stream is bubbled through a container of DI water which collects the treated particles, before exiting the system.

The treated samples show increased affinity for water and disperse in water upon mixing, while the untreated PTFE particles remain on the surface of the water. X-ray Photoelectron Spectroscopy (XPS) is performed on untreated PTFE and air plasma treated PTFE and summarized below:

| Sample | Composition | | |
|---|---|---|---|
| | Carbon | Oxygen | Fluorine |
| Untreated PTFE | 34% | 1% | 65% |
| Treated PTFE air plasma | 35% | 10% | 53% |

The untreated PTFE particles show a small amount of surface oxidation from exposure to air (1%), however, after treatment, the XPS data shows an increase in oxygen in surface chemical groups to 10%. The chemical data indicates an increase in polar functional groups that tend to bring about a hydrophilic nature, which correlates to the increase in hydrophilicity that is observed when dispersing the treated samples in water. This example demonstrates that the PTFE particles undergo chemical surface modification according to one embodiment of the invention.

Example 2

In this example, polypropylene (PP) micro-sized particles of size 350 micron (Sigma Aldrich) are treated according to the teachings of the present invention. The atmospheric pressure plasma device is comprised of a pulsed DC power source (Plasmatreat GmbH, Germany) operating under conditions of 250-350 V, 3.7-4.1 Amps, a pulse frequency of 20-21 kHz, and a duty cycle of 90-100% with dry air as the carrier gas flowing at 1800 L/hr. The reactor configuration used in this example included feeding the polypropylene particles through a narrow channel with the transport driven by gravity, similar to FIG. 2. Deionized (DI) water and a solution of 10% HEMA in DI water are used as the chemical precursor and delivered at a rate ranging from 1-10 g/min into the plasma treatment zone. The treated particles are collected using DI water delivered in a port downstream of the treatment zone via a spray apparatus with nitrogen as a carrier gas to separate the treated particles and collect as a water dispersion.

Figure 3:
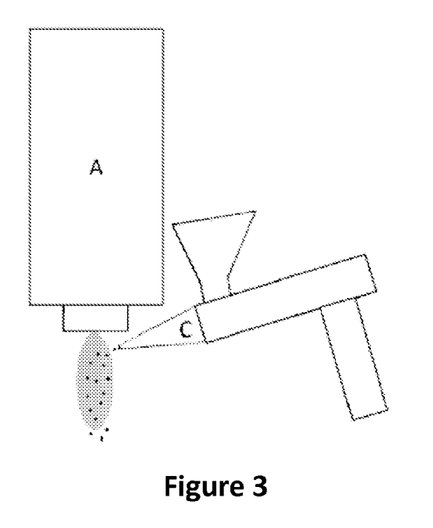
FIGS. 3-18 are schematic representations of additional apparatus configurations for treating the surface of the particles according to the teachings of the present disclosure.

Polypropylene is a hydrophobic polymer and the particles do not mix or disperse in water. The treated samples are compared to untreated PP by mixing in water, as shown in FIG. 3. This figure is obtained immediately after mixing the samples in the beakers, in which the treated sample shows significant mixing and dispersing of the particles into the water, while the untreated particles did not mix with water. In other words, the treated samples easily mixed with water, in contrast to the untreated particles. Because the density of polypropylene is lower than water and the particle sizes are relatively high, the particles separated to the top after about 20 seconds. However, the particle surface remains wettable, spreading on the surface of the water, while the untreated particles clustered together on the surface due to their hydrophobicity. The treated particles spread over the surface of the water, clearly showing an increase in surface wettability as a result of treatment.

Figure 4:
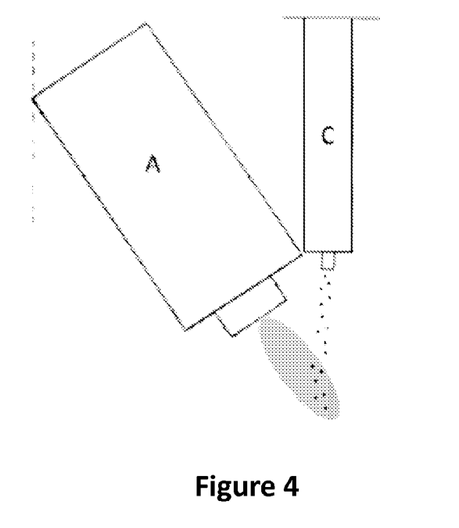
Figure 5:
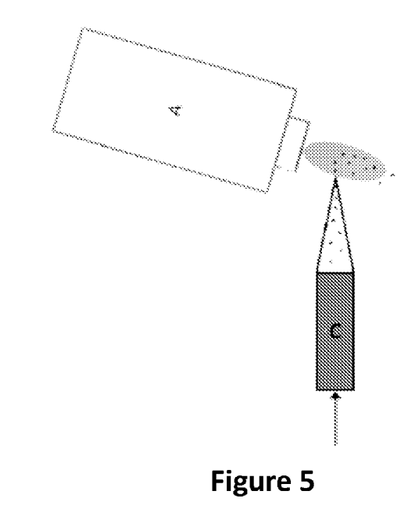
Figure 6:
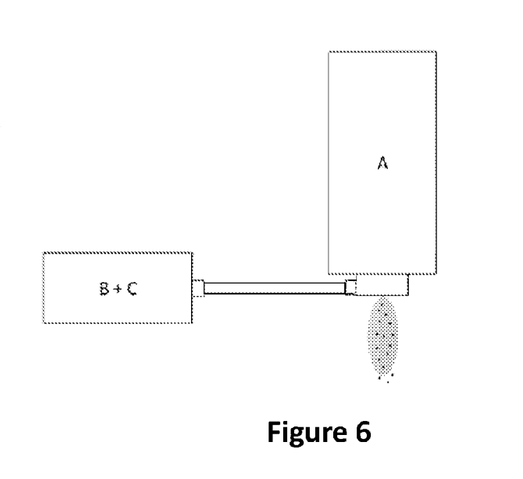
Figure 7:
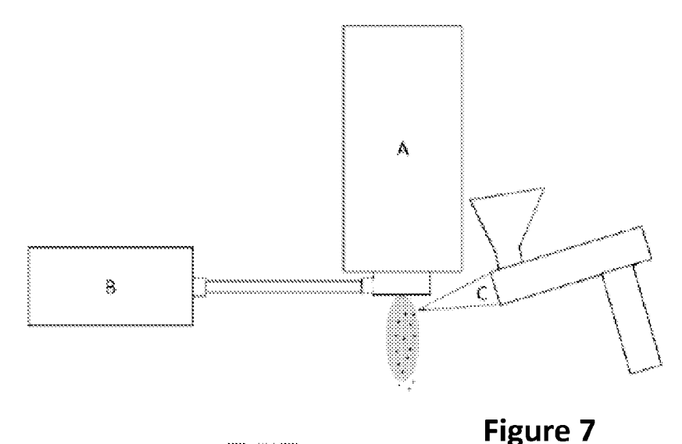
Figure 8:
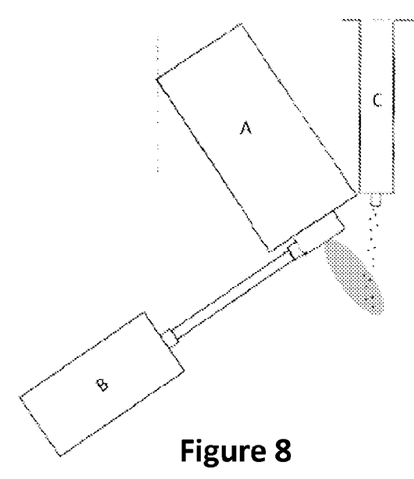
Figure 9:
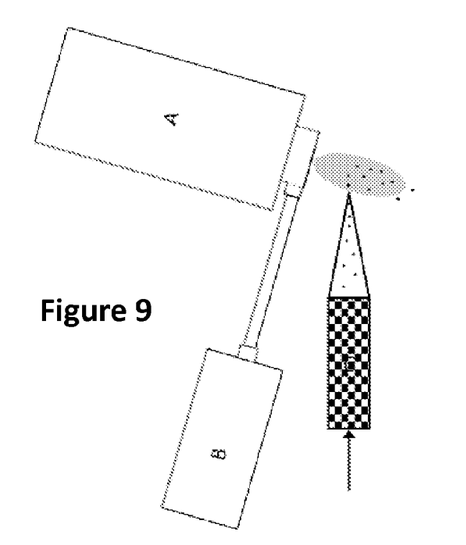
Figure 10:
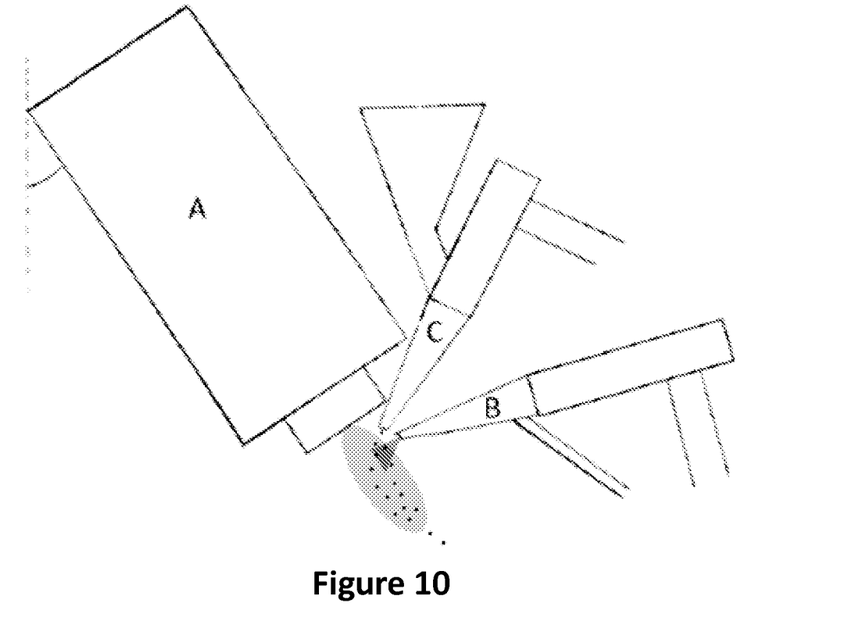
Figure 11:
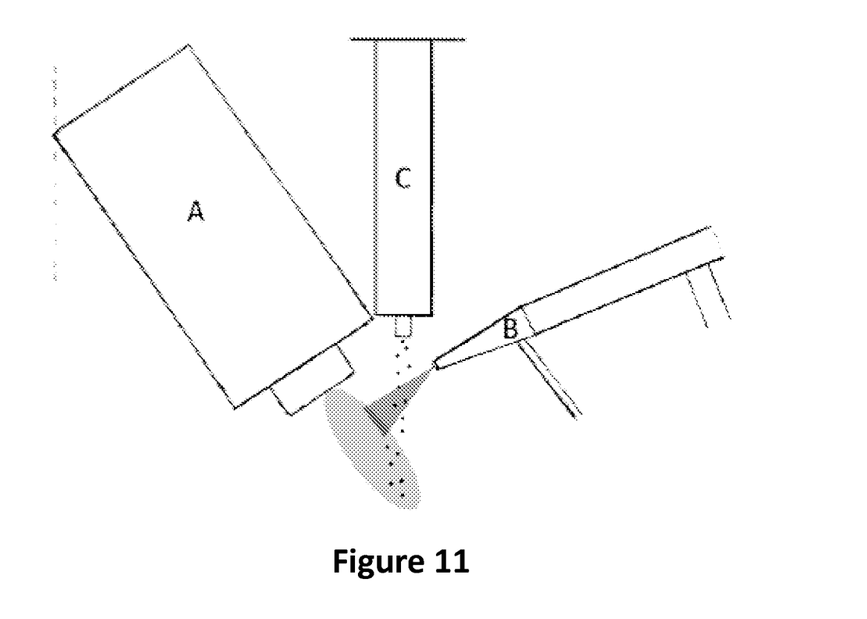
Figure 12:
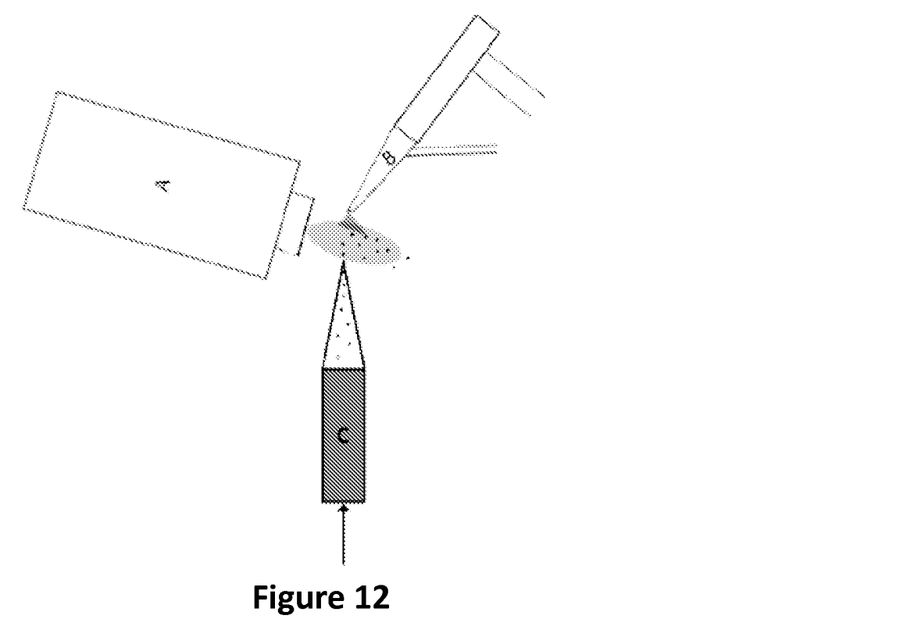
Figure 13:
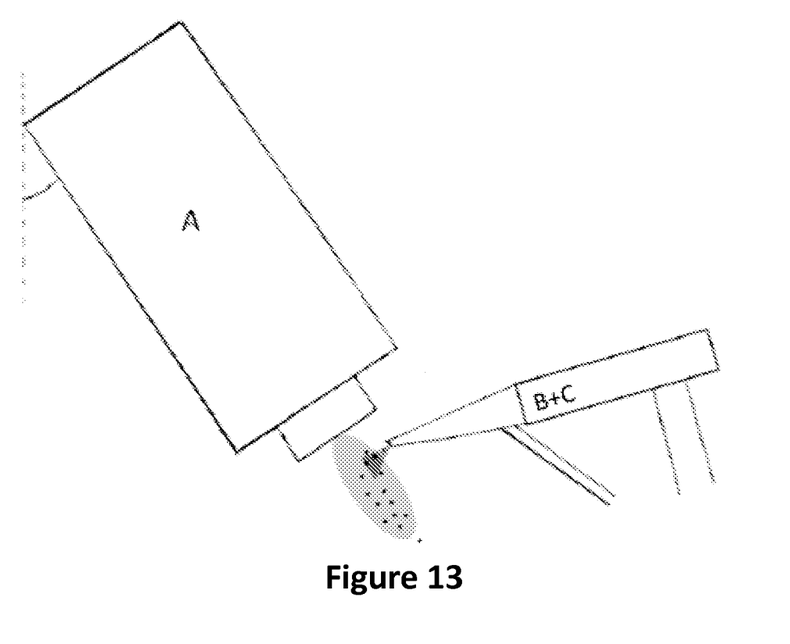
Figure 14:
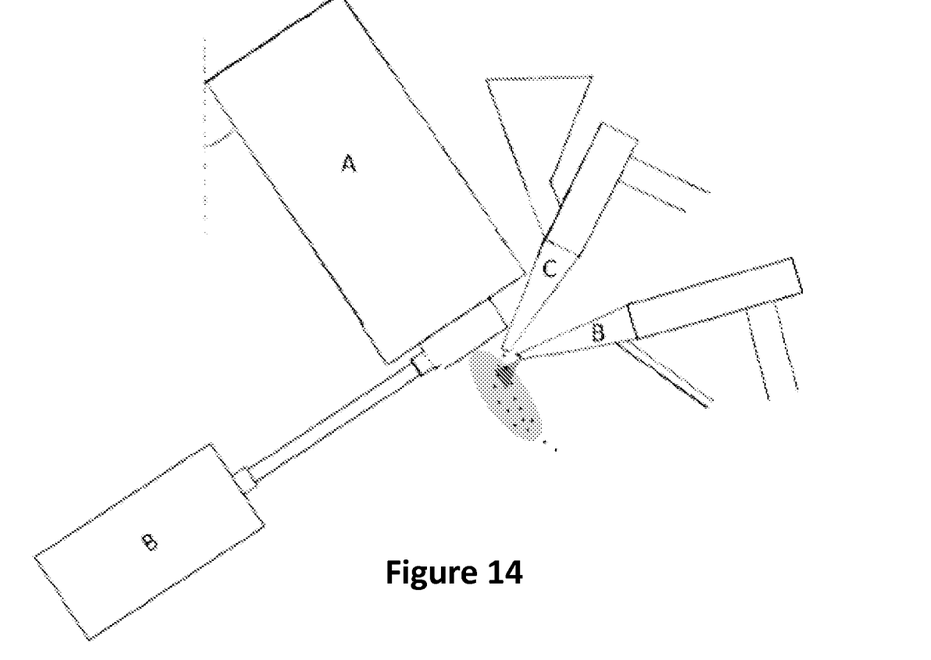
Figure 15:
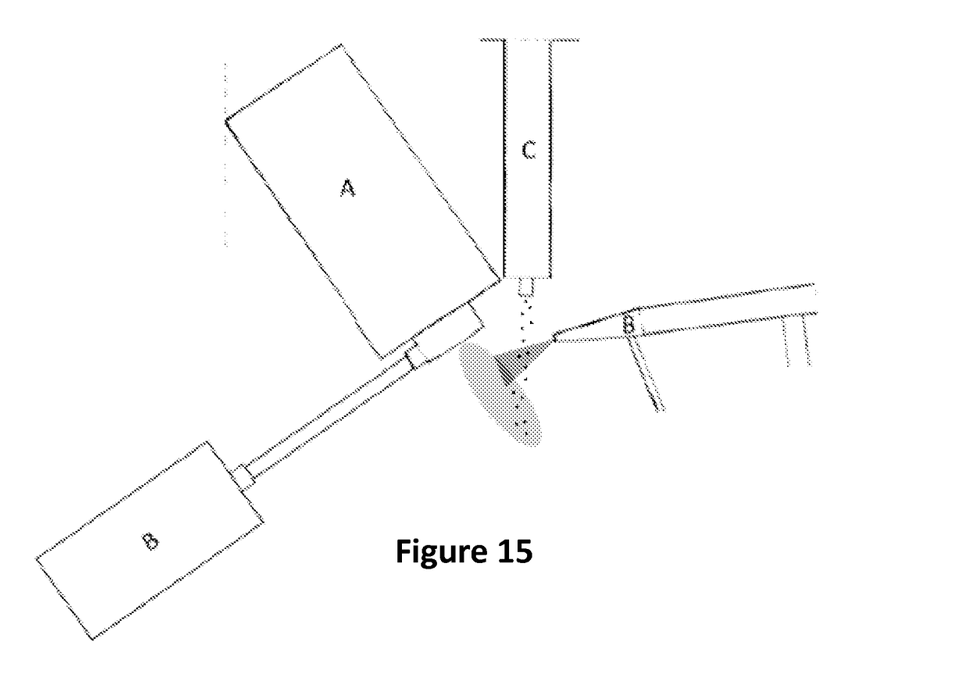
Figure 16:
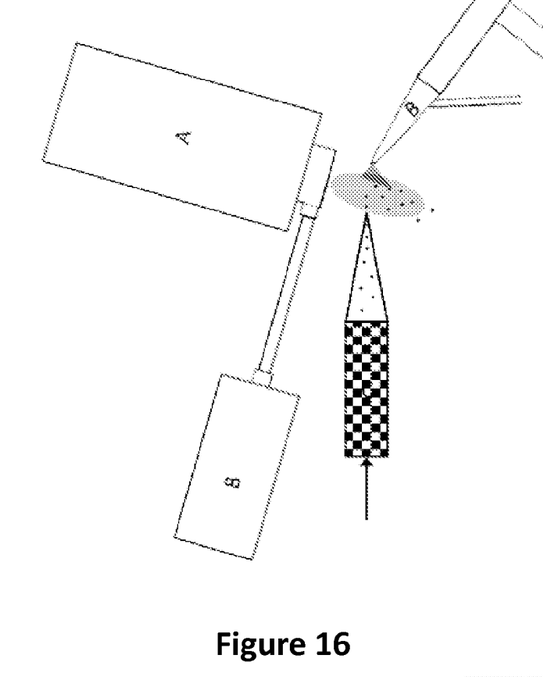
Figure 17:
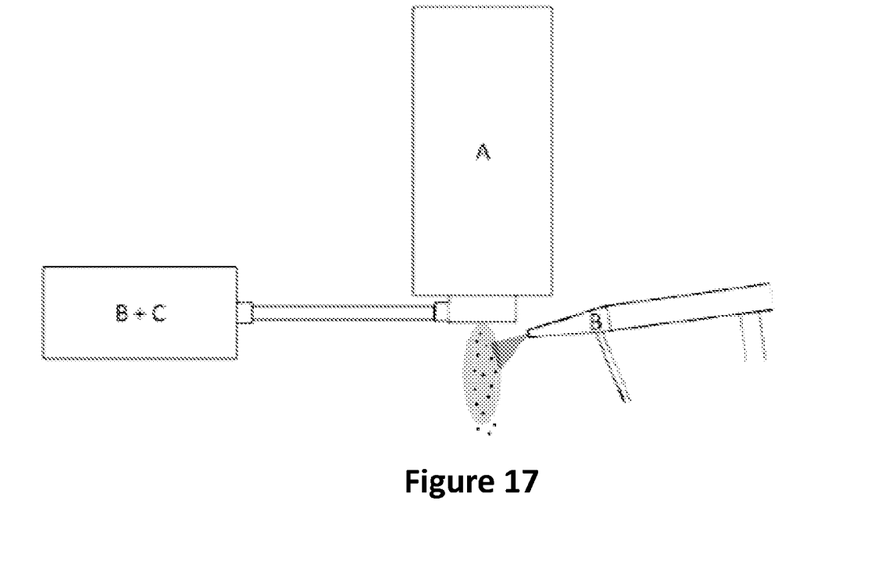
Figure 18:
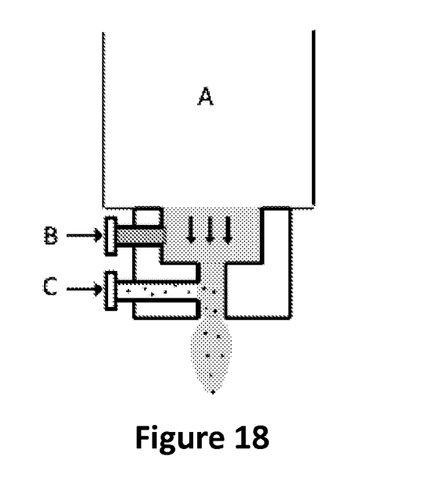
Figure 19:
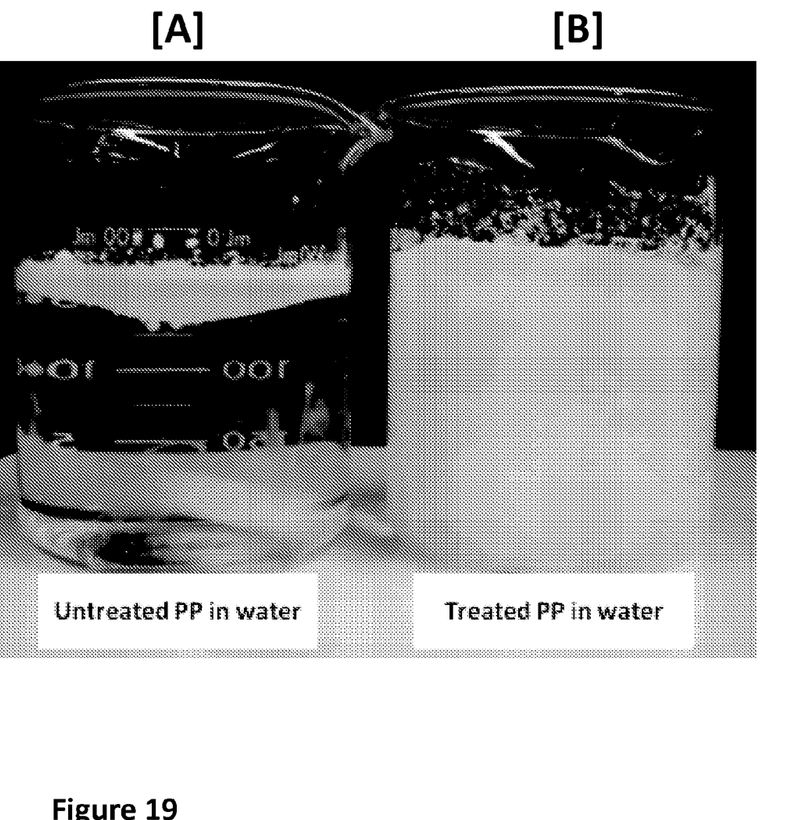
FIG. 19 is a photographic depiction of a dispersion of (A, left) untreated particles and (B, right) particles treated according to the teachings of the present disclosure.
Figure 20:
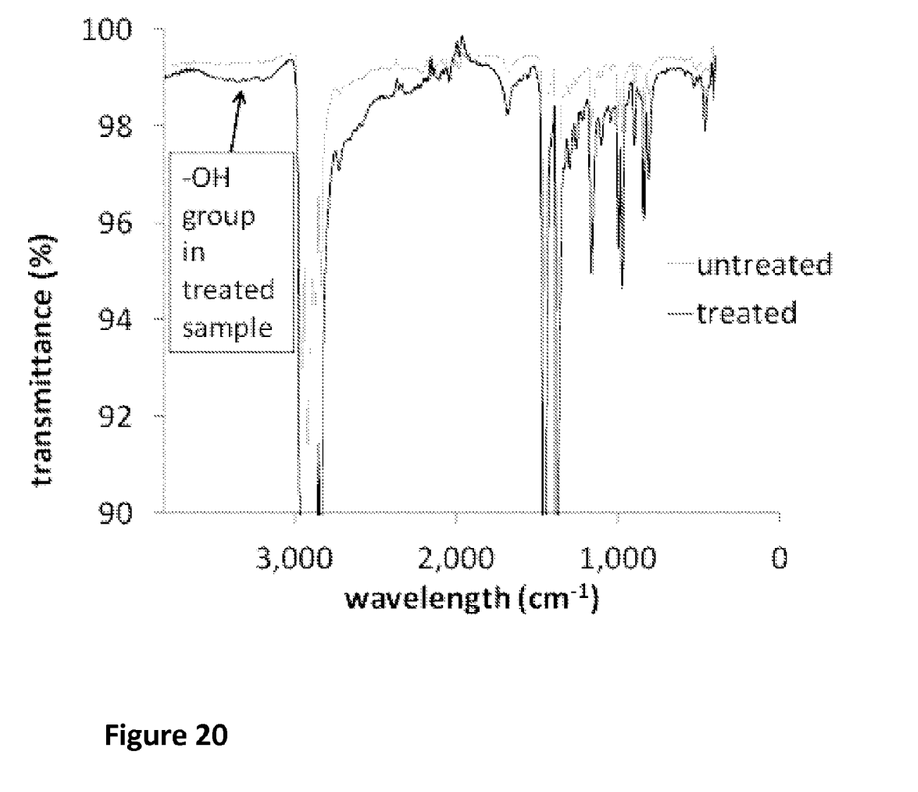
FIG. 20 is a Fourier Transform Infrared (FTIR) spectrum of treated particles.
Figure 21:
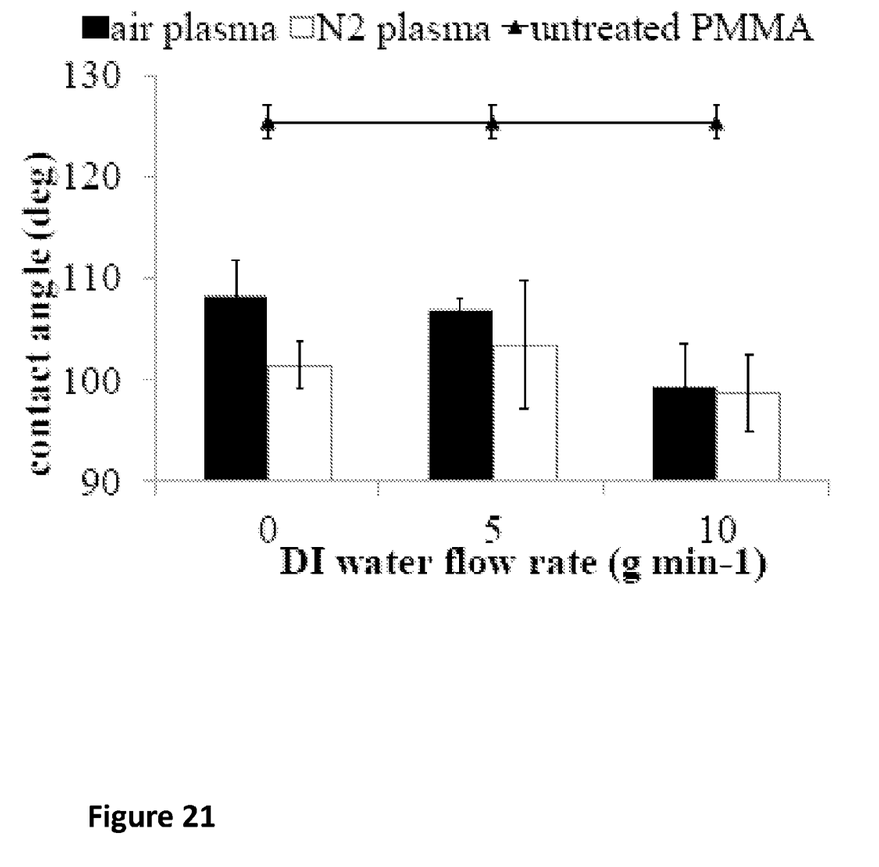
FIG. 21 is a graphic representation of the contact angles measured for untreated particles and particles treated according to the teachings of the present disclosure.

Chemical analysis is performed on the polypropylene particle surfaces. Referring now to FIG. 4, a graph of the Fourier Transform Infrared (FTIR) results demonstrates that —OH functional groups are present around 3500-3200 $cm^{-1}$ in the treated powder, while such groups are not present in untreated PP particles. XPS is performed on the treated PP powder in order to examine the nature of the surface chemical functional groups. The XPS data is shown below for representative PP samples:

| Sample | Composition | | |
|---|---|---|---|
| | Carbon | Oxygen | Nitrogen |
| Untreated PP | 98% | 2% | 0% |
| Treated PP DI Water | 79% | 18% | 2% |
| Treated PP 10 wt % HEMA in DI Water | 82% | 18% | 0% |

The untreated PP particles show a small amount of surface oxidation from exposure to air (2%), however, after treatment, the XPS data shows an increase in oxygen in surface chemical groups to 18%. The chemical data indicates an increase in polar functional groups that tend to bring about a hydrophilic nature, which correlates to the increase in hydrophilicity that is observed. This example demonstrates that the PP particles undergo chemical surface modification according to one embodiment of the invention.

Example 3

In this example, polymethylmethacrylate (PMMA) micro-sized particles of size 250 micron (Sigma-Aldrich Co. LLC) are treated according to the teachings of the present invention. The atmospheric pressure plasma device (Plasmatreat GmbH, Germany) is comprised of a pulsed DC power source operating under conditions of 250-350 V, 3.7-4.1 Amps, a pulse frequency of 20-21 kHz, and a duty cycle of 90-100% with dry air as the carrier gas flowing at 1800 L/hr. The reactor configuration used in this example included feeding the PMMA particles through a narrow channel with the transport driven by gravity, similar to FIG. 2. Deionized (DI) water and a solution of 10% HEMA in DI water are used as the chemical precursor and delivered at a rate ranging from 1-10 g/min into the plasma treatment zone. The treated particles are collected using DI water delivered in a port downstream of the treatment zone via a spray apparatus with nitrogen as a carrier gas to separate the treated particles and collect as a water dispersion.

The treated PMMA particles are evaluated using water contact angle of the pressed powders onto glass slides. The contact angle of water on flat, smooth PMMA is typically around 75°, while the contact angle of the pressed untreated PMMA powder is measured at 125.4° (standard deviation 2.8°, three powder presses with one droplet each and 2 measurements per droplet). This is because the powder is in the Cassie state, in which the droplet is suspended on top of a heterogenous, porous surface with air filling the voids underneath, creating an angle of contact higher than the flat, smooth material. All treated samples show a statistically significant (p-value <0.001) lower contact angle than the untreated powder with a range of 92°-114°. The samples are grouped by steam flow rate and plasma gas and compared to untreated PMMA, shown in FIG. 5.

XPS analysis is performed on the PMMA powders to evaluate surface chemical changes. The XPS data from the PMMA powders using a high resolution scan at C1s for evaluating the changes in carbon bonding are shown below:

| Sample | Binding Energy and Composition | | |
|---|---|---|---|
| | 284 eV (C—C, C—H) | 286 eV (C—O) | 288 eV (C=O) |
| Untreated PMMA | 57% | 29% | 14% |
| Treated PMMA DI Water | 49% | 35% | 17% |
| Treated PMMA 10 wt % HEMA in DI Water | 49% | 35% | 17% |

The PMMA molecules contain ester groups with carbon oxygen bonding that bring about a hydrophilic nature. The treated particles clearly show an increase in the carbon-oxygen bonds at the surface, which correlates to the decrease in water contact angle after treatment. This example demonstrates that the PMMA particles undergo chemical surface modification according to one embodiment of the invention.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for the surface chemical functionalization of nano- and micro-sized solid particles; the method comprising the steps of:
    a. producing a homogeneous atmospheric plasma glow discharge at zero potential and comprising energetic plasma species at high velocities;
    b. delivering directly a chemical precursor fluid as a liquid to the plasma glow discharge and allowing the precursor fluid to be chemically activated by interaction with the energetic species in the plasma glow discharge;
    c. de-agglomerating or metering a gas stream comprising nano- or micro-sized particles, such that the particles are separated into primary particles each having a surface, and transporting the stream of the primary particles to the plasma glow discharge;
    d. modifying the surface of the primary particles by reaction with the energetic species and the chemically activated precursor fluid to form treated particles;
    e. optionally, delivering a chemical or biological component downstream of the treated particles that react with active sites on the treated particles to bond to the surfaces; and
    f. collecting the surface modified particles and separating them from the gas stream as dry particles or in a liquid in a collection vessel.

2. The method according to claim 1, wherein the atmospheric plasma glow discharge is formed by a plasma jet arising from plasma generated in a plasma generation chamber that is allowed to exit the chamber.

3. The method of claim 2, wherein the chemical precursor fluid is delivered to the atmospheric plasma glow discharge or upstream from the discharge.

4. The method according to claim 1, wherein transporting the stream of primary particles to the plasma glow discharge and reacting the surface of the primary particles with the chemically activated precursor fluid occurs simultaneously.

5. The method according to claim 1, wherein the plasma glow discharge is created using a plasma source comprising direct current (DC), pulsed DC, radio frequency, microwave, or hybrid technology and a monatomic gas, molecular gas, or mixture thereof capable of sustaining the homogeneous plasma glow discharge exiting a plasma generation chamber at zero potential.

6. The method according to claim 1, wherein the nano- or micro-sized particles comprise an organic, inorganic, polymeric material, or biological material with the particles being solid or hollow.

7. The method according to claim 1, wherein the chemical precursor fluid is selected as one from the group of compounds that can impart hydrophilic groups to the surface of the particles.

8. The method according to claim 7, wherein the chemical precursor fluid is selected as one from the group of alcohols, acids, amines, ketones, aldehydes, phosphorous or sulfur containing chemicals, nitrogen-containing chemicals, organosilicon material, and biomolecules.

9. The method according to claim 1, wherein the stream of nano- or micro-sized particles is formed by dispersing or atomizing the particles in a carrier gas using turbulence and centrifugal forces to break apart any agglomerates into separated primary particles.

10. The method according to claim 1, wherein the nano- or micro-sized particles are transported using gravitational force and a controlled delivery to deliver as separated particles.

11. The method according to claim 1, wherein a chemical or biological component or mixture of components is added downstream of the treated particles for surface grafting or immobilization.

12. The method according to claim 11, wherein the chemical or biological component or mixture of components is selected as one or more from the group of organic molecules, hybrid molecules, monomers, polymers, organo- silicon compounds, biological materials, biomolecules, pharmaceuticals, enzymes, vitamins, antibodies, or proteins.

13. The method according to claim 1, wherein the surface modified particles are collected from the gas stream using a dry separation technique involving centrifugal, gravitational, inertial forces, or filters.

14. The method according to claim 1, wherein the surface modified particles are collected from the gas stream using a wet separation technique.

15. The method according to claim 14, wherein the wet separation technique uses a liquid that is the same as a liquid medium used for the collection of the particles, a component of the liquid medium, or a chemical compatible with the liquid medium in which the particles will be used in their final application.

16. The method according to claim 1, wherein the method further includes operating the process under a reduced pressure achievable by the addition of a vacuum pump downstream of the plasma glow discharge.

* * * * *